United States Patent [19]
Williams

[11] 3,760,267
[45] Sept. 18, 1973

[54] MOISTURE TESTER FOR CONTINUALLY FLOWING GRANULAR MATERIALS

[75] Inventor: D. Michael Williams, Rock Island, Ill.

[73] Assignee: Agridustrial Electronics, Inc., Bettendorf, Iowa

[22] Filed: Apr. 3, 1972

[21] Appl. No.: 240,423

[52] U.S. Cl............................................... 324/61 R
[51] Int. Cl............................................... G01r 27/26
[58] Field of Search............... 324/61 R, 61 P, 65 R, 324/65 P

[56] References Cited
UNITED STATES PATENTS

| | | | |
|---|---|---|---|
| 2,665,409 | 1/1954 | Rogers | 324/61 R |
| 3,566,260 | 2/1971 | Johnston | 324/61 R |
| 3,092,882 | 6/1963 | Dietert | 324/65 R X |
| 3,238,452 | 3/1966 | Schmitt et al. | 324/61 R |
| 3,226,635 | 12/1965 | Moe | 324/61 R |
| 3,559,052 | 1/1971 | Fathauer | 324/61 R |

FOREIGN PATENTS OR APPLICATIONS

| | | | |
|---|---|---|---|
| 570,086 | 2/1933 | Germany | 324/65 P |
| 827,004 | 1/1960 | Great Britain | 324/61 P |

Primary Examiner—Stanley T. Krawczewicz
Attorney—Glenn H. Antrim et al.

[57] ABSTRACT

A moisture tester of the type having outer and inner cylindrical electrodes and means for measuring permittivity has an upper extension connected to receive by gravity samples of material from a conveyor and a lower, funnel-shaped outlet for discharging material back into the mainstream at a lower point. The upper extension of predetermined length is continually overfilled, and the funnel-shaped portion has an opening of required form and size to control the flow of material by gravity, and thereby to provide a desired close and consistent amount of packing between the electrodes.

6 Claims, 4 Drawing Figures

Patented Sept. 18, 1973 3,760,267

MOISTURE TESTER FOR CONTINUALLY FLOWING GRANULAR MATERIALS

BACKGROUND OF THE INVENTION

This invention is related to moisture testers and particularly to testers for measuring continually the moisture of granular materials while the materials are being conveyed.

Moisture test cells for continually measuring granular materials such as grain are shown in U.S. Pat. No. 2,665,409 issued to C.E. Rogers on Jan. 5, 1954 and in U.S. Pat. No. 2,788,487 issued to W. Grogg, Jr. on Apr. 9, 1957. According to the Rogers Patent, material is discharged from the chute and falls by gravity between two parallel plates that function as a capacitor; an improvement over the Rogers Tester according to the Grogg Patent utilizes cylindrical, coaxial electrodes in a test cell and has a conveyor screw for conveying material upwardly through the test cell to an upper chute.

SUMMARY OF THE INVENTION

The test cell of this invention has inner and outer coaxial, cylindrical electrodes that have their axis vertical during use. A desired uniform and consistent packing within the cell is provided by an outlet comprising a funnel-shaped reducing member extending downwardly from the lower edge of the outer electrode and a cylindrical extension at the top edge of the electrode to maintain a column of granular material of constant height above the cell while the extension is overfilled. The only force required and used to cause the granular material to flow through the cell is gravity. The input to the upper extension may include a sampling member with openings at spaced points across a conveyor to divert to the test cell combined small portions that together contain the average moisture content of all material being conveyed. The inner electrode of the cell contains a temperature-compensating element connected to an electrical test circuit for measuring capacitance between the electrodes. A cap over the inner electrode protects the temperature-compensating element by preventing passage of material axially through the inner electrode.

DESCRIPTION OF THE PREFERRED EMBODIMENTS

Figure 1:
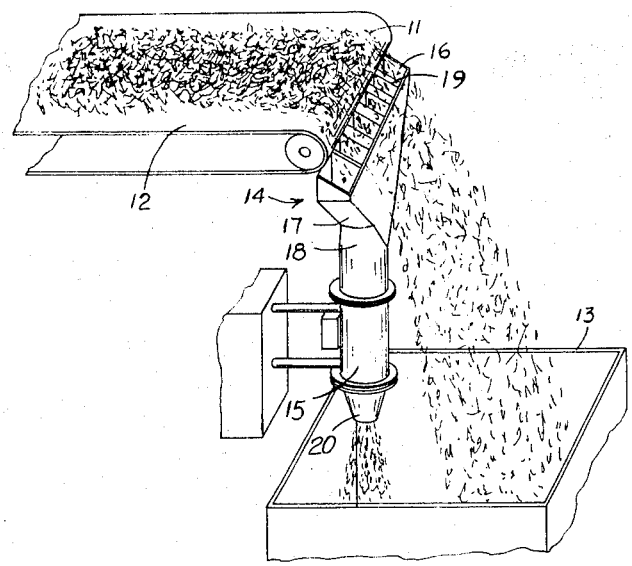
FIG. 1 is a top perspective view of a test cell mounted at the end of a belt conveyor.

A tester according to the accompanying drawing tests continually a representative sample of material moving in a conveyor by diverting a portion of the stream of material and passing the diverted portion through a capacitive-type moisture test cell. As shown in FIG. 1, granular material 11 is being conveyed on a conveyor belt 12 to a chute 13. Most of the granular material flows over a sampling chute or diverter 14 to fall into the chute 13, but a portion falls through the sampling chute 14 and the test cell 15.

A preferred sampling chute 14 for a flat belt has an elongated, rectangular, top intake 16, and sides 17 converging from the ends of the intake to a lower, central, circular outlet connected to the upper inlet of a cylindrical extension 18 for the top of the test cell 15. The sampling chute 14 and the cell 15 have a vertical axis, and the top intake of the sampling chute is slanted from the horizontal at an angle between about 20° and 45° such that the top edge of the chute 14 farther from the belt 12 is lower than the edge adjacent the belt. Also, the upper portion of the sampling chute 14 has spaced parallel dividers 19 across the intake 16.

The collection of material to be tested from somewhat evenly-spaced points across a conveyor belt is particularly important when a plurality of chutes are used to deposit material at different locations on the belt. The width of the dividers 19 for different positions should be determined to provide representative samples from points across the belt and to provide a combined flow just sufficient to maintain the extension 18 packed full. Particularly the dividers 19 near the center of the top intake 16 where the distance to the extension 18 is shorter may need to be wider than those near the ends of the intake, the wider dividers cause a greater flow of material from their positions to the main stream and divert less amounts of the material from those positions downwardly to the column in the moisture tester. The configuration and size of the top of the chute may be different for different types of conveyors.

The force for movement of grain through the test cell 15 is by gravity only. The rate of flow to provide close and consistent packing of material is controlled by the length of the cylindrical extension 18 above the electrodes of the test cell 15 and by the size of the opening of the funnel-shaped outlet member 20.

Figure 2:
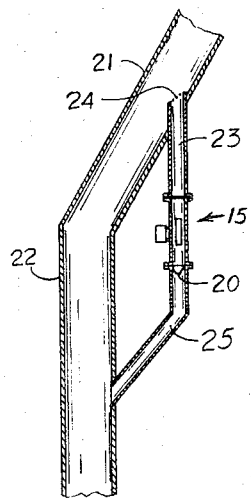
FIG. 2 is a vertical cross-sectional view of a test cell mounted on a cylindrical gravity conveyor.

Another installation of the test cell 15 to a different type of conveyor is shown in FIG. 2. The conveyor is a downwardly extending tubular gravity or pneumatic conveyor having a portion 21 of a main conveyor tube slanting downwardly and another portion 22 disposed vertically. The test cell 15 is disposed on a vertical portion of a relatively small, tubular passageway comprising a vertical extension within the acute angle formed by the main portions 21 and 22. The cell must be oriented to have its longitudinal axis substantially vertical to allow continuous flow of closely-packed, granular material without clogging.

The vertical extension 23 corresponds to the extension 18 of FIG. 1, and likewise, it is overfilled to provide in conjunction with the funnel-shaped outlet member 20, a desired degree of packing. The upper end of the extension 23 enters vertically the slanting portion 21 and continues upwardly a short distance above the inside surface of its wall, and the edge of the upper opening slants downwardly at an angle between 20° and 45° with respect to horizontal. The fines of the material being conveyed tend to flow along the inside wall of the portion 21 of the conveyor around the protruding, vertical end of the extension 23; a screen 24 covers its upper opening to exclude extra large pieces which could clog in the test cell. The lower end of the test cell is connected by a tube 25 that bends from vertical to a downwardly slanting direction to connect to the vertical portion 22 of the conveyor.

Figure 3:
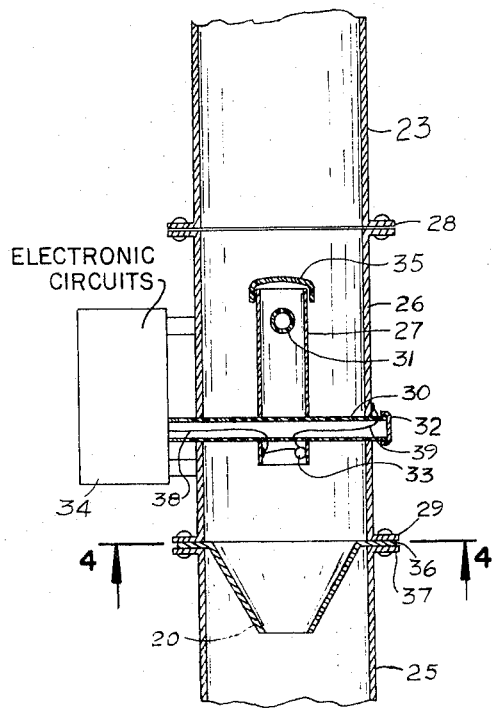
FIG. 3 is a detailed cross-sectional view of the test cell of FIG. 2.
Figure 4:
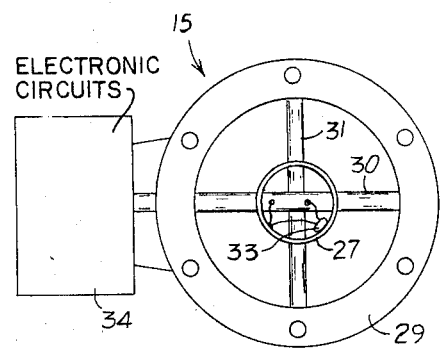
FIG. 4 is a bottom view of the test cell on the line 4—4 of FIG. 3.

The test cell as shown more clearly in FIGS. 3 and 4 comprises an outer conductive cylinder 26 that functions as an outer electrode of a capacitor, and a coaxial inner cylinder 27 that functions as an inner electrode. The upper end of the cylinder 26 has a conventional outwardly-extending pipe flange 28 connected to a mating flange on the lower end of the extension 23, and the lower end of the cylinder 26 has a similar flange 29 connected to a flange 36 of the funnel-shaped outlet member 20 and a flange 37 of the tube 25. The inner electrode 27 is coaxially mounted within the outer electrode 26 by two diametrically positioned insulating rods 30 and 31 that are spaced apart vertically and that are preferably oriented at right angles in an axial view of the cell 15. The rods 30 and 31 extend through the walls of both electrodes 26 and 27 and are retained in position by retaining caps 32 pressed on the ends of the rods. The inner electrode 27 is enough shorter than the outer electrode 26 so that the vertical distance between the tops of the electrodes is about one to one and one-half times the diameter of the inner electrode to prevent change in capacitance due to variation in field at the ends of the cell.

At least one of the supporting rods 30 and 31 is hollow, and it serves as a conduit for conductors connected between electronic circuits and the inner electrode 30. Since signal applied across the electrodes 26 and 27 of the test cell is high frequency, and small capacitance changes are being measured, the stray capacitance along the conductors to the electrodes must be a minimum, consistent value. To maintain a small value, a single conductor is threaded through each end of the rod 30 as shown in FIG. 3. A housing 34 for the electronic circuits is mounted adjacent the outer electrode 26, and one end of the rod 30 extends into the housing to exclude moist material from the conductor within that end of the rod. A conductor 38 is connected to the electronic circuits and is threaded through the end of the rod, out an opening in the central portion of the rod 30, and connected to an adjacent point on the inner wall of the inner electrode 27. A temperature-compensating capacitor 33 thermally contacts the inner wall of the inner electrode 27 and has one terminal connected to the inner wall, conveniently at the point where the conductor 38 is connected, and its other terminal connected to a conductor 39 threaded through the other end of the supporting rod 30 for connection to an adjacent point on the outer wall of the outer electrode 26 that is a common or ground connection. By this arrangement, the conductors are isolated to eliminate excessive stray capacitance. A protective cap 35 fits over the top of the inner electrode 27 to prevent material from passing through the electrode where it might damage the capacitor 33.

Although the funnel-shaped outlet member 20 might be permanently secured to the bottom of the cylindrical outer electrode 26 of the test cell, preferably it is attached by the flangle 36 and suitable bolts. The upper portion of the member 20 has an opening with a diameter equal to the inside diameter of the outer electrode 26, and the flange 36 extends outwardly from this upper portion and is positioned between the flange 29 of the test cell and a flange 37 of the connecting tube 25. Obviously, this arrangement for securing the outlet member 20 permits installation or removal of the test cell from a conveyor line without moving either of the connecting tubes 23 and 25. The angle of the conical portion that is inclined inwardly and downwardly from its mounting flange 36 is sufficient to permit granular materials to flow freely, and the diameter of the smaller, lower opening is chosen to provide a desired degree of packing and flow in the test cell 15. A lower outlet of proper size to allow material, e.g. grain, to flow downwardly within the upper portion of the cell 15 at the rate of one inch per second is satisfactory.

The electronic circuits contained in the housing 34 include an oscillator, a voltage divider or bridge circuit including either a capacitor or a resistor in series with the electrodes 26 and 27 of the test cell, a detector or rectifier connected to the test cell and the voltage divider, a direct-current amplifier and generally a threshold circuit to detect output voltage above a predetermined value. The interconnection of these circuits is shown and their operation described in U.S. application Ser. No. 152,186 for a Grain Moisture Tester filed by Roy E. Resh on June 11, 1971 and assigned to the assignee of this application. The amplifier circuits supply an analogue direct-current output that may be connected to a controller for controlling the speed of operation of motor that determines the rate of flow of material through a dryer; or conversely, in manufacturing processes where an increased amount of moisture is required, a direct-current output may be used to control flow of water from sprayers that are spraying water onto the granular material.

I claim:

1. A moisture tester for testing continually flowing granular materials comprising:
   an outer member comprising an outer electrode and a funnel-shaped portion, said outer electrode being a cylinder of conductive material with its axis disposed vertically, said funnel-shaped portion extending downwardly from said cylinder such that the lower portion of the wall of said outer member slants inwardly to provide a reduced outlet,
   an inner electrode comprising an inner cylindrical conductive member, the length of said inner electrode being substantially shorter than the length of said outer electrode,
   insulating mounting means between said electrodes to support said inner member coaxially within said cylinder of said outer member, the upper and the lower ends of said inner electrode being spaced sufficiently within the upper and the lower ends respectively of said outer electrode to prevent substantial end electrical field effects,
   electrical means connected to said electrodes for measuring capacitance therebetween,
   conveyor means for supplying a continuous flow of granular material to a position over the top end of said outer member such that the only force applied to the granular material as it flows through said outer member and about said inner member is gravity, the size of said reduced outlet and the flow from said conveyor means being proportioned to maintain said cylinder for said outer electrode substantially uniformly packed with flowing granular material.

2. A moisture tester as claimed in claim 1 wherein a sensing temperature element is connected to said electrical means and is thermally contacting the inside surface of said inner member.

3. A moisture tester as claimed in claim 2 having a cover over the top of said inner member to protect said sensing temperature element.

4. A moisture tester as claimed in claim 2 wherein said insulating mounting means is a pair of rods diametrically disposed through the walls of said inner member and said outer member, said rods being spaced apart along the vertical axis of said members.

5. A moisture tester as claimed in claim 4 wherein at least one of said rods is hollow, and electrical conducting means for connecting said inner member to said electrical means is disposed within said hollow rod.

6. A moisture tester as claimed in claim 5 wherein said conducting means includes a conductor within one end of said hollow rod connected between said electrical means and said inner electrode and another conductor within the other end of said hollow rod connected between said temperature-sensing element and said outer electrode.

* * * * *